US011362987B2

(12) United States Patent
Saidumuhamed et al.

(10) Patent No.: US 11,362,987 B2
(45) Date of Patent: Jun. 14, 2022

(54) FULLY QUALIFIED DOMAIN NAME-BASED TRAFFIC CONTROL FOR VIRTUAL PRIVATE NETWORK ACCESS CONTROL

(71) Applicant: Pulse Secure, LLC, San Jose, CA (US)

(72) Inventors: Shanavas Kottikal Saidumuhamed, Thrisssur (IN); Prabhath Thankappan, Kottayam (IN); John Alappattu Varudunny, Thrissur (IN); George Mathew Koikara, Bangalore (IN)

(73) Assignee: Pulse Secure, LLC, San Jose, CA (US)

( * ) Notice: Subject to any disclaimer, the term of this patent is extended or adjusted under 35 U.S.C. 154(b) by 0 days.

(21) Appl. No.: 16/988,022

(22) Filed: Aug. 7, 2020

(65) Prior Publication Data

US 2020/0366639 A1   Nov. 19, 2020

Related U.S. Application Data

(63) Continuation of application No. 16/388,719, filed on Apr. 18, 2019, now Pat. No. 10,742,595.

(30) Foreign Application Priority Data

Apr. 20, 2018   (IN) .............................. 201841015035

(51) Int. Cl.
*G06F 15/16* (2006.01)
*H04L 61/4552* (2022.01)
(Continued)

(52) U.S. Cl.
CPC ...... *H04L 61/1552* (2013.01); *H04L 12/4633* (2013.01); *H04L 12/4641* (2013.01);
(Continued)

(58) Field of Classification Search
CPC . H04L 12/4641; H04L 61/1511; H04L 63/101
See application file for complete search history.

(56) References Cited

U.S. PATENT DOCUMENTS 5,990,810 A   11/1999  Williams
6,470,329 B1  10/2002  Livschitz
(Continued)

OTHER PUBLICATIONS

Extended Search Report from counterpart European Application No. 19170582.1, dated Aug. 16, 2019, 10 pp.
(Continued)

*Primary Examiner* — Hieu T Hoang (57) ABSTRACT

A system includes a virtual private network (VPN) gateway and a client device. The VPN gateway receives a domain name system response through a physical coding sublayer. The VPN gateway fetches a fully qualified domain name corresponding to the domain name system response, and fetches one or more access control list rules from an access control list table for a specific user account. The VPN gateway installs an Internet protocol (IP) address in the access control list table for each access control list rule and handles requested data traffic to the IP address. The client device creates a virtual tunnel interface route with a port of a transmission control protocol (TCP) listener device and parses the domain name system response. The client device updates a domain name system cache with the fully qualified domain name and the IP address and sends unencrypted network traffic over the virtual tunnel interface route.

10 Claims, 8 Drawing Sheets

(51) Int. Cl.
*H04L 12/46* (2006.01)
*H04L 12/66* (2006.01)
*H04L 61/4511* (2022.01)
*H04L 9/40* (2022.01)
*H04L 69/16* (2022.01)

(52) U.S. Cl.
CPC .......... *H04L 12/66* (2013.01); *H04L 61/1511* (2013.01); *H04L 63/101* (2013.01); *H04L 69/16* (2013.01)

(56) References Cited

U.S. PATENT DOCUMENTS

| | | | |
|---|---|---|---|
| 6,789,118 B1* | 9/2004 | Rao | H04L 45/10 370/230 |
| 6,832,322 B1* | 12/2004 | Boden | H04L 29/12481 726/15 |
| 7,080,077 B2 | 7/2006 | Ramamurthy et al. | |
| 7,181,017 B1* | 2/2007 | Nagel | H04L 9/0825 380/282 |
| 7,366,761 B2 | 10/2008 | Murray et al. | |
| 7,600,125 B1 | 10/2009 | Stringham | |
| 7,634,811 B1* | 12/2009 | Kienzle | G06F 21/33 726/22 |
| 7,734,792 B2 | 6/2010 | Kumar et al. | |
| 7,734,826 B2 | 6/2010 | Brown et al. | |
| 7,849,507 B1 | 12/2010 | Bloch et al. | |
| 7,873,695 B2 | 1/2011 | Clegg et al. | |
| 8,122,493 B2 | 2/2012 | Drako et al. | |
| 8,260,742 B2 | 9/2012 | Cognigni et al. | |
| 8,423,631 B1 | 4/2013 | Mower et al. | |
| 8,443,435 B1* | 5/2013 | Schroeder | H04L 63/0272 726/15 |
| 8,554,933 B2 | 10/2013 | Reyes et al. | |
| 8,621,556 B1 | 12/2013 | Bharali et al. | |
| 8,762,554 B2 | 6/2014 | Trace et al. | |
| 8,768,895 B2 | 7/2014 | Patterson et al. | |
| 8,776,209 B1* | 7/2014 | Kumar | H04L 63/0272 726/12 |
| 8,831,014 B2 | 9/2014 | Koodi et al. | |
| 8,955,128 B1* | 2/2015 | Trama | H04L 63/1491 726/23 |
| 8,977,728 B1 | 3/2015 | Martini | |
| 9,112,911 B1* | 8/2015 | Karhade | H04L 63/102 |
| 9,124,627 B2 | 9/2015 | Bharali et al. | |
| 9,137,211 B2 | 9/2015 | Parla et al. | |
| 9,246,876 B1* | 1/2016 | Melam | H04L 12/4641 |
| 9,313,130 B2 | 4/2016 | Takenaka et al. | |
| 9,319,377 B2 | 4/2016 | Vempati et al. | |
| 9,363,235 B2* | 6/2016 | Wei | H04W 12/068 |
| 9,602,411 B2 | 3/2017 | Lapidous et al. | |
| 9,608,962 B1* | 3/2017 | Chang | H04L 63/107 |
| 9,692,725 B2 | 6/2017 | Venkatraman et al. | |
| 9,692,734 B2* | 6/2017 | Lapidous | H04L 63/0428 |
| 10,419,965 B1* | 9/2019 | Kadosh | H04L 61/2592 |
| 10,742,595 B2 | 8/2020 | Kottikal et al. | |
| 2001/0010543 A1 | 8/2001 | Schmidt et al. | |
| 2003/0005306 A1 | 1/2003 | Hunt et al. | |
| 2005/0004954 A1 | 1/2005 | Soule | |
| 2006/0143702 A1* | 6/2006 | Hisada | H04L 12/4641 726/15 |
| 2007/0027992 A1* | 2/2007 | Judge | G06Q 10/107 709/227 |
| 2007/0061887 A1* | 3/2007 | Hoover | H04L 63/10 726/26 |
| 2007/0156900 A1* | 7/2007 | Chien | H04L 63/1441 709/225 |
| 2009/0031415 A1* | 1/2009 | Aldridge | H04L 63/0272 726/15 |
| 2009/0193498 A1* | 7/2009 | Agarwal | H04L 63/105 726/1 |
| 2011/0206052 A1* | 8/2011 | Tan | H04L 61/2514 370/395.53 |
| 2012/0102226 A1 | 4/2012 | Hopmann et al. | |
| 2013/0290563 A1* | 10/2013 | Fleischman | H04L 61/1511 709/245 |
| 2013/0333038 A1* | 12/2013 | Chien | G06F 21/645 726/23 |
| 2014/0211807 A1* | 7/2014 | Takenaka | H04L 45/72 370/392 |
| 2014/0344917 A1 | 11/2014 | Parla et al. | |
| 2015/0207809 A1* | 7/2015 | Macaulay | G06F 21/552 726/22 |
| 2015/0229609 A1* | 8/2015 | Chien | G06F 21/6218 726/13 |
| 2015/0271132 A1 | 9/2015 | Erb | |
| 2016/0269353 A1* | 9/2016 | Chan | H04L 12/4633 |
| 2016/0277359 A1* | 9/2016 | Karunakaran | H04L 61/2592 |
| 2016/0323186 A1* | 11/2016 | Dillon | H04L 47/12 |
| 2017/0272470 A1* | 9/2017 | Gundamaraju | H04W 4/24 |
| 2018/0131620 A1* | 5/2018 | Su | H04L 47/2441 |
| 2019/0173785 A1* | 6/2019 | Kameyama | H04L 45/70 |
| 2019/0215308 A1* | 7/2019 | Feyzibehnagh | H04L 63/0428 |

OTHER PUBLICATIONS

Response to Extended Search Report dated Aug. 16, 2019 from counterpart European Application No. 19170582.1, filed Apr. 22, 2020, 11 pp.
Notice of Allowance dated Apr. 8, 2020 received in U.S. Appl. No. 16/388,719, 11 pp.
Examination Report from counterpart European Application No. 19170582.1, dated Oct. 2, 2020, 6 pp.
Response to Examination Report dated Oct. 2, 2020 from counterpart European Application No. 19170582.1, filed Mar. 31, 2021, 13 pp.

* cited by examiner

FULLY QUALIFIED DOMAIN NAME-BASED TRAFFIC CONTROL FOR VIRTUAL PRIVATE NETWORK ACCESS CONTROL

This application is a continuation of U.S. application Ser. No. 16/388,719 filed Apr. 18, 2019, which claims the benefit of IN application no. 201841015035, filed Apr. 20, 2018, each of which are hereby incorporated by reference.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Pulse Secure LLC.

TECHNICAL FIELD

The techniques described herein relate to systems, software, and methods for handling network traffic.

BACKGROUND

Layer 3 FQDN based split tunneling exists in desktop devices. The split tunneling is performed by dynamic per-IP routing or a kernel mode driver. However, a problem exists when attempting to perform Layer 3 FQDN based split tunneling on mobile devices because mobile device manufacturers prefer to isolate VPN clients installed on mobile platforms, e.g., the VPN clients are sandboxed, which forces the VPN clients to only route data packets exiting from the mobile device over a VPN socket, to direct the data packets to a private network gateway for further processing. The VPN tunnel is a secure connection. Each of the VPN client and the private network gateway operate to encrypt data packets that pass from the mobile computing device to the private network gateway and that pass from the private network gateway to the mobile computing device.

While some mobile computer device platform vendors provide a virtual tunnel interface where VPN clients can set IP-based routes for receiving IP traffic that needs to be tunneled, they do not allow setting FQDNs for splitting traffic. While some mobile computer device platforms like iOS support FQDN based split tunneling for Layer 4 traffic, a Layer 4 VPN tunnel is very limited and lacks many features of a Layer 3 VPN tunnel.

SUMMARY

In general, the techniques described herein include systems and methods for controlling VPN traffic using fully qualified domain names (FQDNs). More specifically, the techniques described herein include utilizing FQDNs to assist various functions in a VPN and classifying Transmission Control Protocol (TCP) and User Diagram Protocol (UDP) network traffic exiting from and/or returning to a mobile device for security reasons. For instance, the techniques described herein may use a FQDN access control list built on a VPN gateway device. The techniques described herein may also use FQDN-based traffic splitting to build a domain name system (DNS) cache database on a mobile computing device. The network traffic is classified at the Open System Interconnection (OSI) model network Layer 3 according to an IP address assigned to a FQDN, or a host name, associated with the source or destination address of the network traffic. IP addresses corresponding with FQDNs are determined by a request to resolve the FQDN to IP address using a DNS snooping technique.

In one example of the techniques described herein, a system includes a virtual private network (VPN) gateway configured to: receive a domain name system response through a physical coding sublayer; fetch a table entry corresponding to the domain name system response, wherein the table entry comprises a fully qualified domain name; fetch one or more access control list rules from an access control list table for a specific user account corresponding to the table entry; install an Internet protocol (IP) address in the access control list table for each of the one or more access control list rules for the specific user account; and handle requested data traffic to the IP address based on the one or more access control list rules; and a client device configured to: create a virtual tunnel interface route between the client device and a port of a transmission control protocol (TCP) listener device; parse a domain name system response packet, received from the VPN gateway, for the fully qualified domain name and an Internet protocol (IP) address; update a domain name system cache with the fully qualified domain name and the IP address; and send unencrypted network traffic to the TCP listener device over the virtual tunnel interface route.

In another example of the techniques described herein, a method includes receiving, by a virtual private network (VPN) gateway, a domain name system response through a physical coding sublayer; fetching, by the VPN gateway, a table entry corresponding to the domain name system response, wherein the table entry comprises a fully qualified domain name; fetching, by the VPN gateway, one or more access control list rules from an access control list table for a specific user account corresponding to the table entry; installing, by the VPN gateway, an Internet protocol (IP) address in the access control list table for each of the one or more access control list rules for the specific user account; and handling, by the VPN gateway, requested data traffic to the IP address based on the one or more access control list rules.

In another example of the techniques described herein, a VPN gateway includes one or more processors; and a storage device configured to store one or more modules operable by the at least one processor to: receive a domain name system response through a physical coding sublayer; fetch a table entry corresponding to the domain name system response, wherein the table entry comprises a fully qualified domain name; fetch one or more access control list rules from an access control list table for a specific user account corresponding to the table entry; install an Internet protocol (IP) address in the access control list table for each of the one or more access control list rules for the specific user account; and handle requested data traffic to the IP address based on the one or more access control list rules.

In another example of the techniques described herein, a non-transitory computer readable storage medium stores instructions that, when executed by one or more processors of a VPN gateway, cause the one or more processors to receive a domain name system response through a physical coding sublayer; fetch a table entry corresponding to the domain name system response, wherein the table entry comprises a fully qualified domain name; fetch one or more access control list rules from an access control list table for a specific user account corresponding to the table entry; install an Internet protocol (IP) address in the access control list table for each of the one or more access control list rules for the specific user account; and handle requested data traffic to the IP address based on the one or more access control list rules.

In another example of the techniques described herein, a method includes creating, by a client device in a virtual private network (VPN), a virtual tunnel interface route between the client device and a port of a transmission control protocol (TCP) listener device; parsing, by the client device, a domain name system response packet, received from a VPN gateway, for a fully qualified domain name and an Internet protocol (IP) address; updating, by the client device, a domain name system cache with the fully qualified domain name and the IP address; and sending, by the client device, unencrypted network traffic to the TCP listener device over the virtual tunnel interface route.

In another example of the techniques described herein, a client device includes one or more processors; and a storage device configured to store one or more modules operable by the at least one processor to: create, in a virtual private network (VPN), a virtual tunnel interface route between the client device and a port of a transmission control protocol (TCP) listener device; parse a domain name system response packet, received from a VPN gateway, for a fully qualified domain name and an Internet protocol (IP) address; update a domain name system cache with the fully qualified domain name and the IP address; and send unencrypted network traffic to the TCP listener device over the virtual tunnel interface route.

In another example of the techniques described herein, a non-transitory computer readable storage medium stores instructions that, when executed by one or more processors of a client device, cause the one or more processors to create, in a virtual private network (VPN), a virtual tunnel interface route between the client device and a port of a transmission control protocol (TCP) listener device; parse a domain name system response packet, received from a VPN gateway, for a fully qualified domain name and an Internet protocol (IP) address; update a domain name system cache with the fully qualified domain name and the IP address; and send unencrypted network traffic to the TCP listener device over the virtual tunnel interface route.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

The features of the present disclosure will best be understood from a detailed description of the techniques and examples thereof selected for the purposes of illustration and shown in the accompanying drawings in which.

These and other aspects and advantages will become apparent when the Description below is read in conjunction with the accompanying Drawings.

DETAILED DESCRIPTION

6.1 Definitions

The following definitions are used throughout, unless specifically indicated otherwise:

| TERM | DEFINITION |
| --- | --- |
| FQDN | Fully Qualified Doman Name |
| ACL | Access Control List |
| VPN | Virtual Private Network |

6.2 Item Number List

The following item numbers are used throughout, unless specifically indicated otherwise.

| # | DESCRIPTION |
| --- | --- |
| 100 | Mobile Device |
| 105 | Microprocessor |
| 110 | Memory |
| 115 | Transmitter |
| 120 | Receiver |
| 125 | I/O Device |
| 130 | Operating System |
| 135 | User Applications |
| 140 | O/S Interface |
| 145 | VPN Control Application |
| 150 | VPN Security Manager |
| 155 | VPN Handler |
| 200 | VPN Handler |
| 205 | Application generating TCP/UDP data |
| 210 | VPN Tunnel Adapter configured with split tunneling disabled |
| 215 | VPN Socket |

-continued

| # | DESCRIPTION |
|---|---|
| 220 | Split tunneling decision based on FQDN and/or IP |
| 225 | DNS Cache |
| 230 | Port Map Table |
| 235 | Redirect to TCP listener |
| 240 | TCP server listener at port X |
| 245 | External Socket |
| 250 | ACL List |
| 255 | VPN Gateway |
| 500 | VPN Gateway |
| 505 | Mobile Computing Device and VPN Client |
| 510 | User Space |
| 515 | Kernel Space |
| 520 | ACL Policy Database |
| 525 | DNS Server |
| 530 | iptable |
| 535 | FQDNACL Processes |
| 540 | NF_Netlink Layer |
| 545 | iptable rules |
| 550 | Ipset rules |
| 600 | VPN Gateway |
| 605 | Gateway Processor |
| 610 | Gateway Memory Module |
| 615 | Transmitter Module |
| 620 | Receiver |
| 625 | Transmitter |
| 630 | Operating System (OS) |
| 635 | Operating System Interface |
| 640 | Authentication Module |
| 645 | Sessions Manager |
| 650 | Session Store |
| 655 | Authentication Policy Information |

6.3 Detailed Description

In general, the techniques described herein include utilizing fully qualified domain names (FQDNs) to assist various functions in a VPN and classifying Transmission Control Protocol (TCP) and User Diagram Protocol (UDP) network traffic exiting from and/or returning to a mobile device for security reasons. For instance, the techniques described herein may use a FQDN access control list built on a VPN gateway device. The techniques described herein may also use FQDN-based traffic splitting to build a domain name system (DNS) cache database on a mobile computing device. The network traffic is classified at the Open System Interconnection (OSI) model network Layer 3 according to an IP address assigned to a FQDN, or a host name, associated with the source or destination address of the network traffic. IP addresses corresponding with FQDNs are determined by a request to resolve the FQDN to IP address using a DNS snooping technique In the previously described sandboxing techniques, not all network traffic passing through the VPN client is necessarily destined for FQDNs that are associated with the private network and not all network traffic passing through the VPN client needs to be encrypted or sent over a secure channel. However, since the VPN client is limited to use of the VPN socket, all network traffic received by the VPN client is encrypted and sent to the gateway of the private network. This forces the gateway of the private network to manage encrypted network traffic that is not associated with the private network and to manage any relay data traffic in response there to, which is also encrypted. As a result, both the VPN client and the gateway of the private network dedicate processor time and VPN tunnel bandwidth to network traffic that does not need to be routed over a secure communication channel. By utilizing the techniques described herein, the VPN client is able to sort network traffic exiting from the mobile computer device into network traffic that requires a secure communication channel and network traffic that does not require a secure communication. In doing so, the VPN client can route the network traffic that requires a secure communication channel over the VPN tunnel and route the remaining network traffic directly to its corresponding destinations, e.g. over a public network using an unsecure communication channel.

Security policies operating on each of the VPN client and the gateway of the private network use an Access Control List (ACL) as a first line of defense for sorting and or granting or denying access to network traffic. Since the VPN tunnel is established OSI Layer 3, the ACL may also operate at Layer 3. This forces the ACL list to associate network traffic policy values, e.g. allow, deny, secure, unsecure, port assignments, or the like with an IP address or IPV6 addresses without reference to the corresponding FQDN, which cannot be deciphered at Layer 3. In network environments where IP addresses are dynamically assigned, a Layer 3 ACL list can quickly become obsolete as FQDNs are assigned new IP addresses, or in some instances the FQDN is assigned multiple IP addresses as can be the case in large enterprise networks. Rather, the techniques described herein refresh Layer 3 ACL lists with updated IP addresses as the IP address corresponding with various FQDNs is altered or when a FQDN is associated with more than one IP address.

Figure 1:
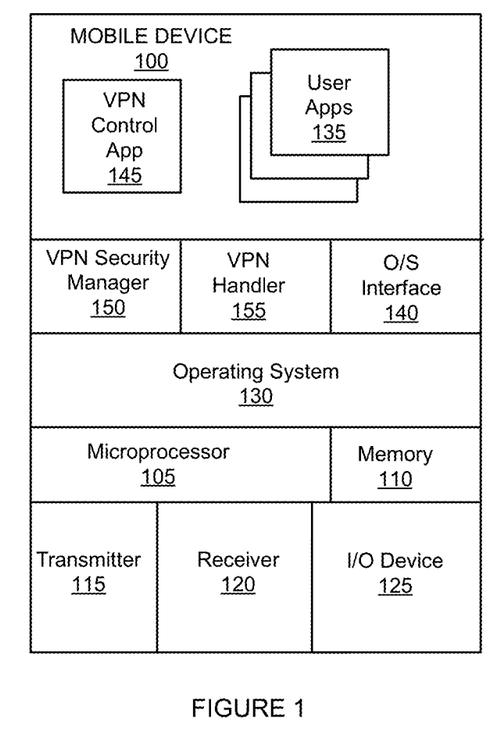
FIG. 1 depicts an example schematic diagram of a mobile computing device that includes a virtual private network tunnel control application interfaced with an operating system of the mobile device, in accordance with one or more techniques described herein.

FIG. 1 depicts an example schematic diagram of a mobile computing device that includes a virtual private network tunnel control application interfaced with an operating system of the mobile device, in accordance with one or more techniques described herein. Referring to FIG. 1, a mobile computing device (100) such as a smart phone, tablet computer, or the like, includes a mobile microprocessor (105), a mobile memory device (110) in communication with the mobile microprocessor, a wireless network interface device that includes a transmitter (115) and a receiver (120), and an input output interface (125) that includes power and various data interfaces. The mobile computing device includes an operating system (130) operating on the mobile microprocessor and mobile memory and a plurality of user applications (135) installed and stored on the mobile memory. Additionally, the mobile computing device may utilize cloud-based user applications locally using local modules corresponding with the cloud-based applications. The mobile computing device may then exchange data corresponding with the cloud-based applications with various network-based appliances, e.g. based on a private network or on another network.

The mobile computing device (100) includes an operating system interface module (140) comprising software resources operating on the mobile microprocessor to provide an interface between the operating system (130) and the user applications (135). The operating system interface module (140) also coordinates allocation of resources of the mobile computing device (100) to the user applications (135) according to policies, rules, and other control features of the mobile computing device and the operating system.

The mobile computing device (100) includes a virtual private network (VPN) client installed and stored on the mobile memory device (110). The VPN client includes a VPN control application (145), a VPN security manager (150) and a VPN tunnel handler (155). The VPN client is configured to manage network communications between the mobile computing device and a private network. The security manager (150) and the VPN tunnel handler (155)

operate to establish a VPN tunnel between the wireless network interface device operating on the mobile computing device (100) and a network gateway corresponding with the private network. Other destinations of the private network or resources of the private network are useable as the destination of the VPN tunnel. The VPN client is configured to encrypt network traffic exiting the mobile computing device and to modify data packets corresponding with the encrypted network traffic to ensure that the encrypted network traffic reaches the network gateway corresponding with the private network, (over the VPN tunnel) and to ensure that any reply data traffic corresponding with the network traffic exiting the mobile computing device is routed back to the mobile computing device. The network gateway, or other resource corresponding with the private network, is configured to encrypt network traffic destined for the mobile computing device before routing the encrypted network traffic to the mobile computing device using a VPN tunnel. The encrypted network traffic destined for the mobile computing device includes reply data traffic responsive to network traffic exiting the mobile computing device as well as network traffic related to operating the private network such as security policy updates, ACL list updates, and availability of alternate network gateways corresponding with the private network that could be used to access services of the private network.

Figure 2:
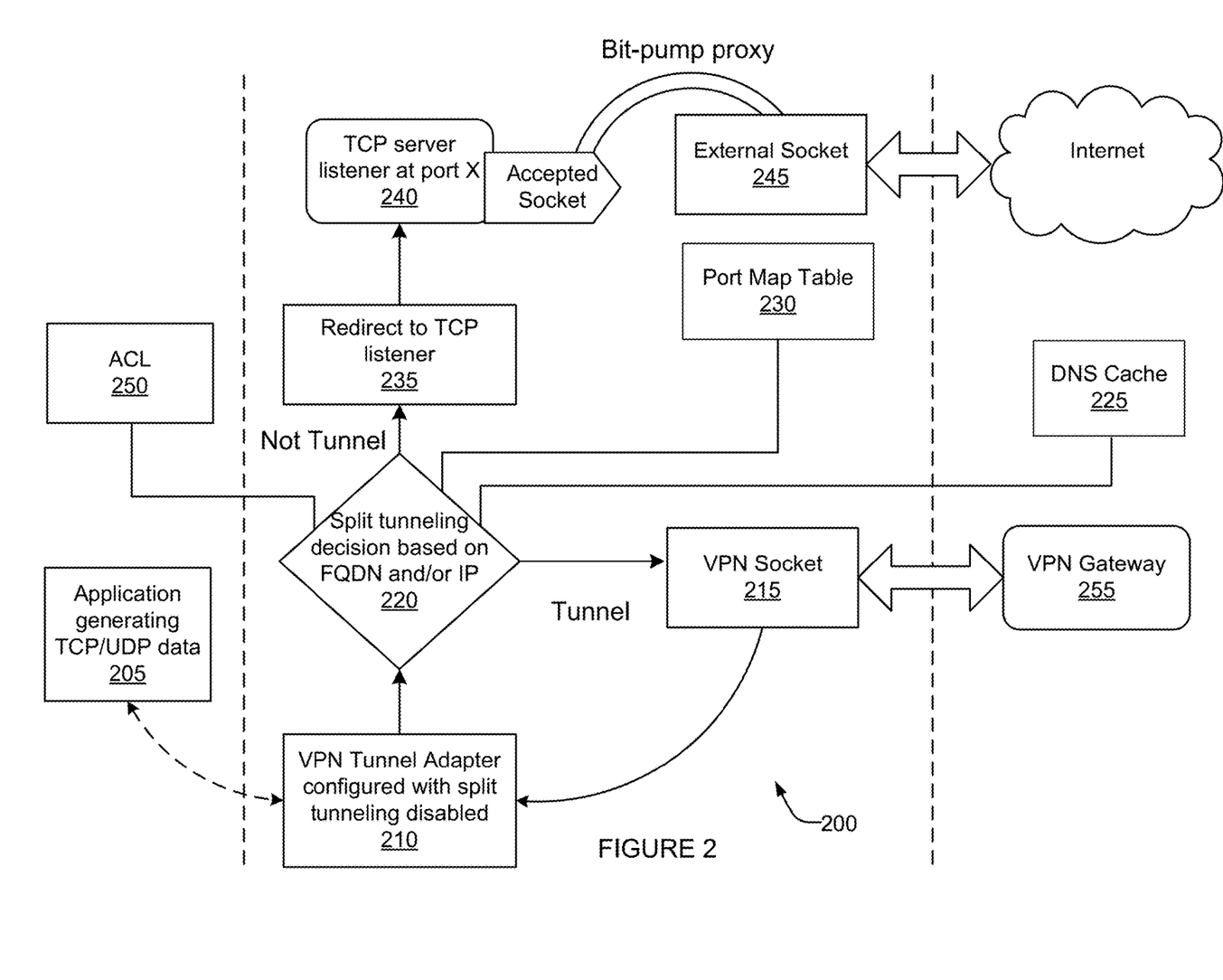
FIG. 2 depicts an example schematic diagram of a mobile computing device that includes a virtual private network tunnel control application for splitting network traffic exiting the mobile computing device between a VPN tunnel and an external socket, in accordance with one or more techniques described herein.

FIG. 2 depicts an example schematic diagram of a mobile computing device that includes a virtual private network tunnel control application for splitting network traffic exiting the mobile computing device between a VPN tunnel and an external socket, in accordance with one or more techniques described herein. Referring to FIG. 2, a VPN handler (200) receives network traffic (205) that originates on the mobile computing device, e.g. that is generated by the user applications operating on the mobile computing device or comprising network traffic related to the VPN client and the private network. The network traffic (205) is parsed by a VPN tunnel adapter (210). The VPN tunnel adaptor (210) determines whether the corresponding network traffic should be sent to the private network over a secure/encrypted VPN tunnel or should be sent directly to its destination IP address over an unsecure/not encrypted public network, or the like. To determine whether to encrypt the network traffic and route it over the VPN socket (215) or whether not to encrypt the network traffic and route it over the external socket (245), the VPN tunnel adapter (210) sorts TCP protocol network traffic by a FQDN corresponding with synchronization (SYN) packet used to initiate a communication session. If the FQDN is associated with the private network, the VPN tunnel adapter (210) designates the related TCP network traffic as requiring encryption and routing over the VPN socket (215). The VPN tunnel adapter (210) sorts UDP protocol network traffic either by its source or destination port or its destination IP address. If the destination IP address or either of the port assignments are associated with the UDP network traffic associated with the private network, the VPN tunnel adapter (210) designates the related UDP traffic as requiring encryption and routing over the VPN socket (215).

In one non-limiting example, the VPN tunnel adapter (210) relies on an Access Control List (ACL) (250) to determine which FQDNs should be routed over the VPN socket (215) or which FQDNs should not be routed over the VPN socket (215). The ACL (250) provides a searchable data storage compartment such as a list, database, or the like, stored on the mobile memory and accessible by the mobile processor. Alternately, the ACL (250) may be stored on the private network or on the gateway to the private network or on a public network and the external ACL can accessed by the VPN tunnel adapter (210) over one of the VPN socket (215) or the external socket (245).

The ACL (250) comprises a list of FQDNs and one or more IP addresses corresponding with each FQDN. The ACL further includes one or more permissions and/or policies associated with each FQDN listed. The permissions and/or policies can include values such as allow, deny, secure, unsecure, or the like. The ACL can also include port assignments corresponding with each FQDN, which can also include one or more permissions and/or policies associated with each port with values such as allow, deny, secure, unsecure, or the like. When a SYN packet or UDP packet corresponding with a FQDN is received by the VPN tunnel adapter (210) the source and destination IP address and port assignments are evaluated in view of the permissions and/or policies associated with the corresponding FQDN listed in the ACL (250) and the data packet is processed according to the listed permissions and/or policies.

In a non-limiting example, the VPN tunnel adapter (210) is operated as a Layer 3 device which can only sort network traffic according to an IP address. In this example, a duplicate of the ACL (250) sorted by IP addresses, i.e. the Layer 3 list does not include the FQDN corresponding with the IP address. Each IP address entry of the Layer 3 list includes values corresponding with the various permissions and/or routing policies associated with the IP address that can be applied or enforced at Layer 3.

In cases where either the IP address corresponding with a FQDN or the FQDN corresponding with an IP address are not included in the ACL (250), the VPN tunnel adapter (210) initiates a DNS query to the DNS Cache (225) to resolve a FQDN or host name to its corresponding IP address. Alternately if the IP address is known, e.g. read from a data packet, and there is no corresponding ACL (250) entry, the VPN tunnel adapter (210) initiates a reverse DNS query to the DNS Cache (225) to determine the FQDN corresponding with the IP address. In either case, the results of the DNS or reverse DNS query are added to the ACL (250) to either overwrite previous entries or add new values to an existing entry. If after resolving a FQDN or reverse resolving an IP address, there are no permissions and/or routing policies associated with the IP address or FQDN, the VPN handler may send the new ACL entry information to the gateway (255) to the private network to determine if the private network has any permissions and/or routing policies associated with the corresponding IP address or FQDN. If the private network does have permissions and/or routing policies associated with the corresponding IP address or FQDN these are sent to the VPN client which updates the corresponding ACL entries. Otherwise, the VPN tunnel adapter (210) will deny network traffic that has no policy information.

Once the VPN tunnel adapter (210) determines which socket will be used to route a data packet or a communication session over, the VPN tunnel adapter (210) prepares each packet as follows. For routing over the VPN socket (215) the packet is encrypted and then encapsulated by a VPN tunnel header. Additionally, information read from the packet such as the source IP address or source application and port assignment or application interface information as well as destination IP address and port assignment are written to the port map table (230). In some examples, the source IP address may already correspond with the VPN socket (215). Thereafter the packet is delivered to the gateway (255) corresponding with the private network. Any return or reply data traffic corresponding with the communication session or individual packets thereof are received over the VPN socket (215). When the replay data traffic is received, the VPN tunnel adapter (210) removes any tunnel headers and decrypts the data packet(s). The VPN tunnel adapter then retrieves the information read from the corresponding exit data packet, such as the source IP address or source application and port assignment or application interface information as well as destination IP address and port assignment stored in the port map table (230) and routes the decrypted data packet back to the application corresponding with the original data packet.

For routing data packets over the external socket (245) the VPN tunnel adapter (210) operates to encapsulate each by a TCP tunnel header configured to direct the encapsulated data packet to a TCP server listener (240) using a designated port. Additionally, information read from the packet such as the source IP address or source application and port assignment or application interface information as well as destination IP address and port assignment are written to the port map table (230). Upon receiving the encapsulated data packet, the TCP server listener (240) removes the TCP tunnel header and routes the data packet to its destination IP address over the external socket (245). The TCP server listener (240) is also configured to insert a source IP address corresponding with the external socket (245) as the source IP address of exit data packets exiting over the external socket (245) and/or the TCP server listener (240) is configured to insert a reply port that corresponds with the external socket (245). Any return or reply data traffic corresponding with the communication session or individual packets that exit the mobile computing device over the external socket (245) are then received over the external socket (245). When the replay data traffic is received, the TCP server listener (240) passes the replay traffic to the VPN tunnel adapter (210) which retrieves the information read from the corresponding exit data packet, such as the source IP address or source application and port assignment or application interface information as well as destination IP address and port assignment stored in the port map table (230) and routes the reply data packet back to the application corresponding with the original data packet.

Figure 3:
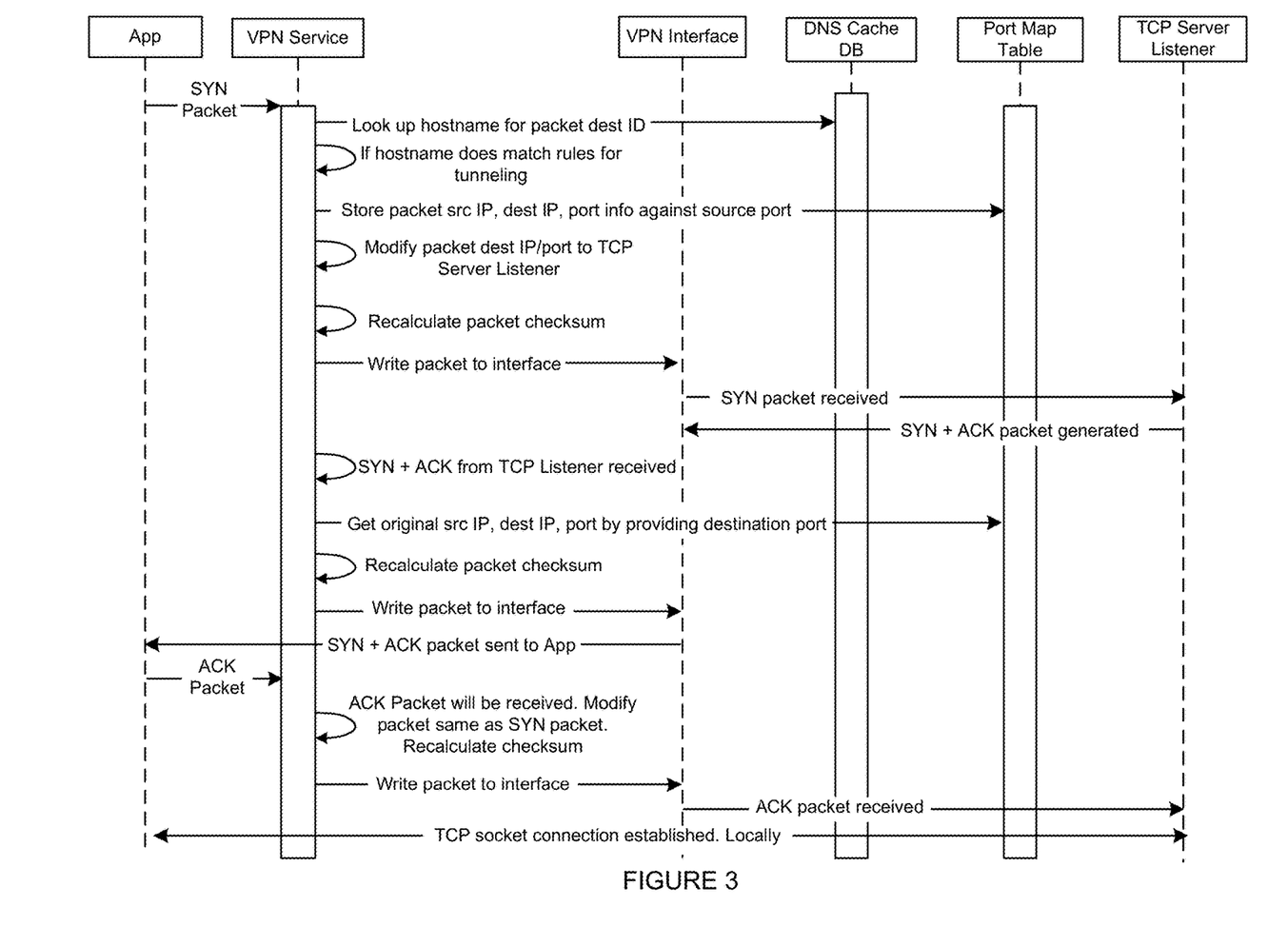
FIG. 3 depicts an example schematic network flow diagram showing a process associated with routing exit data traffic out of mobile computing device over an external socket, in accordance with one or more techniques described herein.

FIG. 3 depicts an example schematic network flow diagram showing a process associated with routing exit data traffic out of mobile computing device over an external socket, in accordance with one or more techniques described herein. Referring to FIG. 3 a schematic diagram depicts portions of the above outlined VPN client process and additional details corresponding with establishing a communication session between an application operating on the mobile computing device and the TCP server listener (240).

Figure 4:
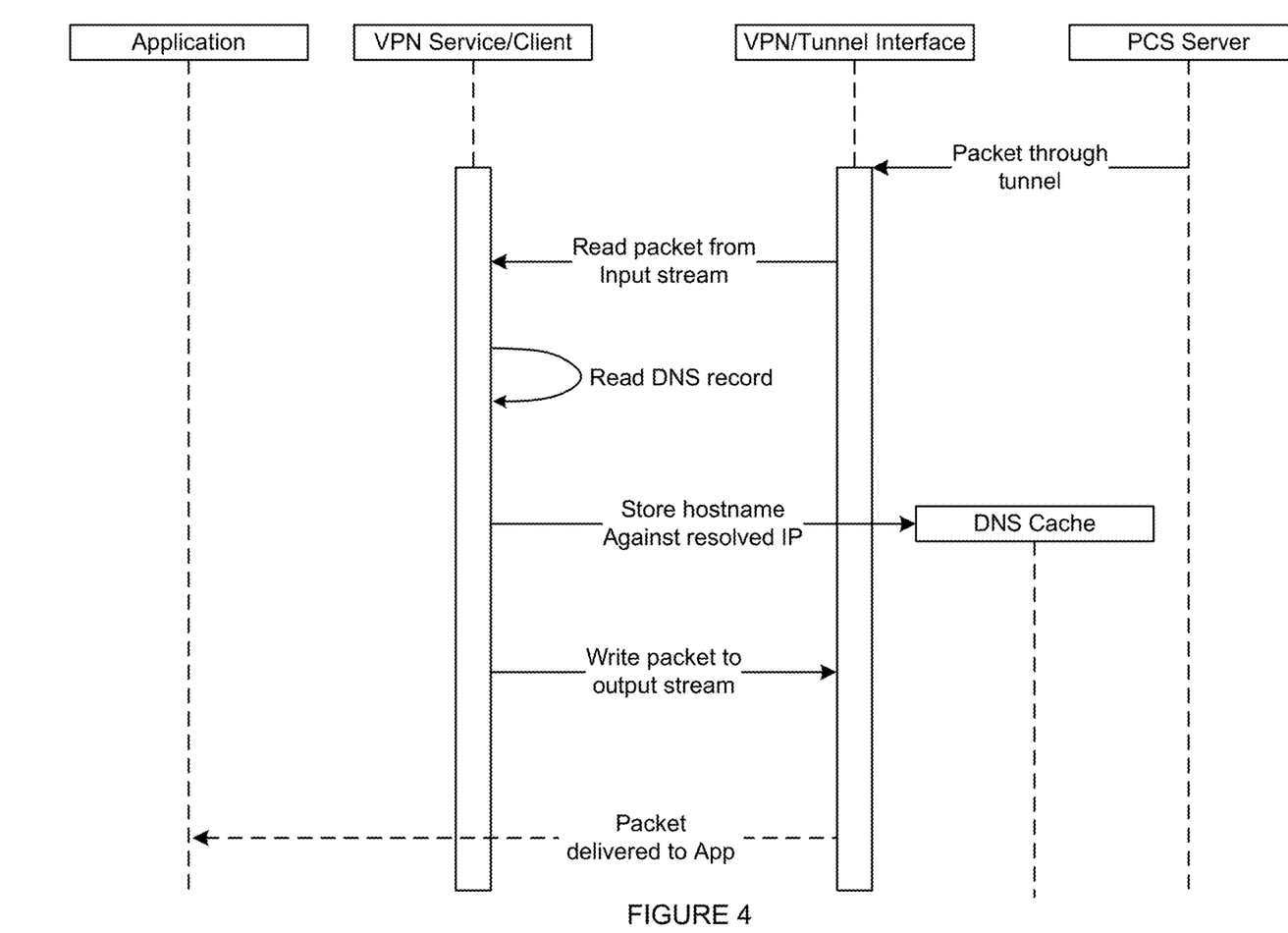
FIG. 4 depicts an example schematic network flow diagram showing a process for associating an IP address with a FQDN based on a DNS request and storing the IP address associated with the FQDN, in accordance with one or more techniques described herein.

FIG. 4 depicts an example schematic network flow diagram showing a process for associating an IP address with a FQDN based on a DNS request and storing the IP address associated with the FQDN, in accordance with one or more techniques described herein. Referring to FIG. 4 a schematic diagram depicts portions of the above outlined VPN client process and additional details corresponding with establishing a communication session between an application operating on the mobile computing device and the gateway (255).

Figure 5:
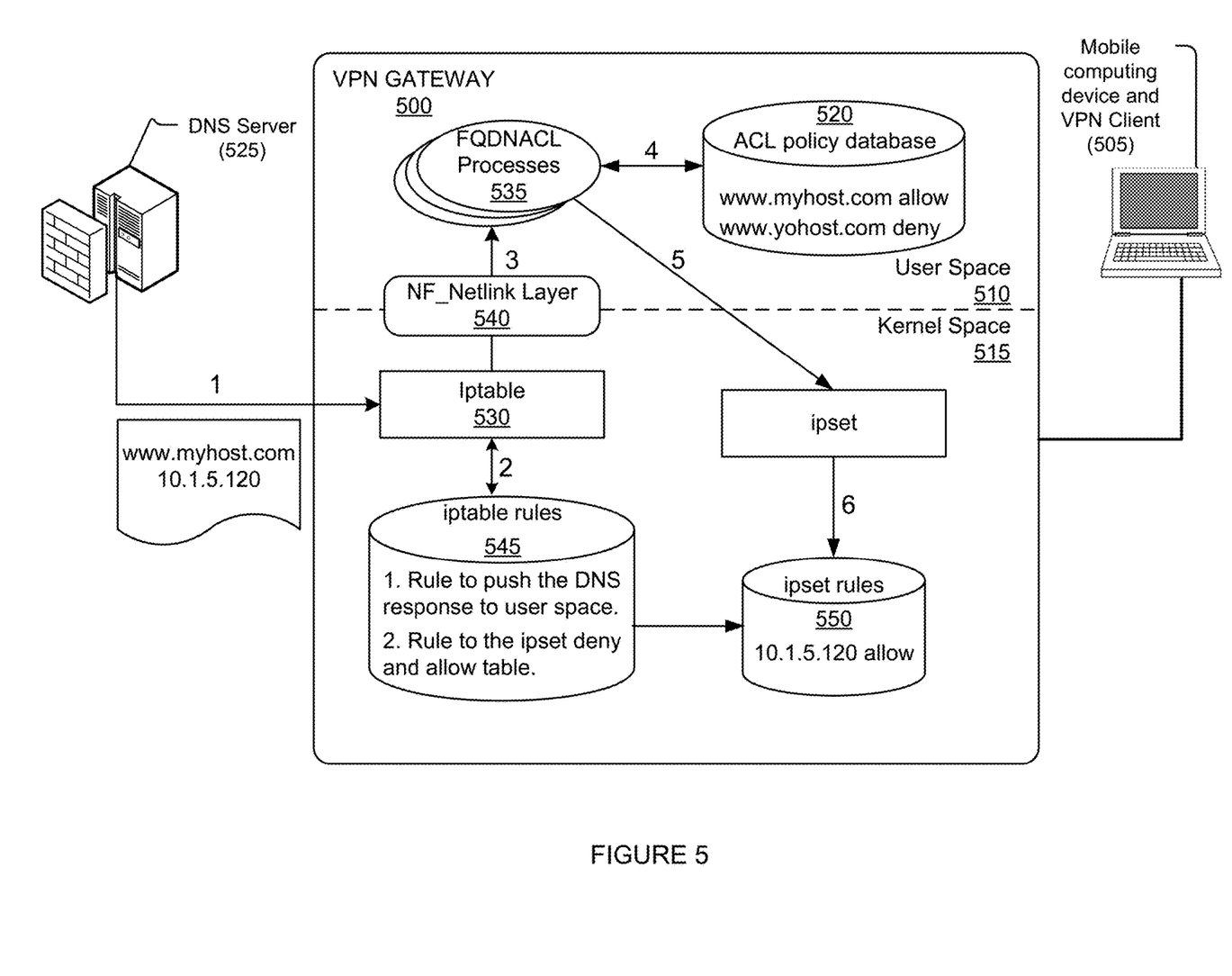
FIG. 5 depicts an example schematic diagram of a portion of a VPN network gateway device that includes ipset rules stored in a kernel space thereof for enforcing access control rules based on IP address, in accordance with one or more techniques described herein.

FIG. 5 depicts an example schematic diagram of a portion of a VPN network gateway device that includes ipset rules stored in a kernel space thereof for enforcing access control rules based on IP address, in accordance with one or more techniques described herein. Referring now to FIG. 5, a portion of a VPN gateway (500) is depicted schematically. The VPN gateway (500) is associated with a plurality of mobile computing devices (505) each operating a VPN client as described above. The VPN gateway (500) provides security services that protect a private network and resources of the private network in part by maintaining an ACL (520) in a user space (510) of the VPN gateway (500). The plurality of mobile computing devices (505) gains access to the private network by establishing a communication session with the VPN gateway (500). As noted above, in some instances substantially all of the network traffic that exits each client devices (505) may be routed to the VPN gateway (500).

The VPN gateway (500) is divided into a user space (510) and a kernel space (515). The user space includes an ACL policy database (520). Like the ACL described above, it relates FQDNs or host names with IP addresses, and in some cases port assignments, with permissions and/or routing or network traffic policies values associated with the corresponding IP address or FQDN and ports. The corresponding values may include allow, deny, secure, unsecure, port assignments, or the like and the IP addresses may include an IP address or IPV6 addresses.

A further aspect of the techniques of this disclosure relates to using a DNS snooping technique, outlined in FIG. 5 to install the ACL (520) at run time. The process includes a first step of every time when a connected VPN client (505) accesses a resource using a FQDN, one of the VPN gateway (500) or the VPN client (505) is configured to generate a DNS request to the DNS server (525) to resolve the FQDN to an IP address. The DNS request and subsequent response from the DNS server (525) is then routed to the VPN gateway (500) either directly or through the VPN client (505). The resolved IP address is received by the iptable (530) operated in the kernel space (515). The VPN gateway (500) then searches through the ACL (520) for the FQDN corresponding with the DNS response to determine if an ACL policy corresponding with the FQDN is already provided. If a matching policy is found for the FQDN, the VPN gateway (500) will install a rule to allow or deny the packet flow between the client and the domain.

The operation starts with a VPN client establishing a tunnel with VPN gateway (500) and starting to browse a website www.myhost.com. The VPN Client (505) then sends a DNS request to the DNS server (525) through the VPN gateway (500). The DNS Server (525), after receiving the DNS resolve request, sends back a response through the iptable (530) and the iptable (530) enters the IP address corresponding to the DNS response. The DNS response is pushed by the iptable (530) to FQDNACL processes (535) through an NF Netlink socket layer (540) based on a Rule 1 stored in the iptable rules (545) which is also in the kernel space (515).

ACL rules for each specific end user account are maintained in the ACL policy database (520). FQDNACL processes (535) will fetch entries specific to the user account and match the user account entries with the FQDNs of each DNS response. If a DNS response corresponding with a host name or FQDN has an ACL policy value of allow, the ACL policy database (520) has an "allow" value for the FQDN or a DBS response, the FQDNACL processes (535) will install the IP address in the allow table of an ipset rules module (550) operating in the kernel space (515).

Once the above steps are completed all traffic between the VPN client and the FQDN that was requested will be allowed by the VPN gateway (500). If the policy in the ACL policy database (520) for the FQDN that was requested is denied, the FQDNACL processes (535) will install a deny entry in the ipset rules module (550), which results in dropping every packet between the VPN client and the FQDN that was requested.

Dynamic Policy Installation:

A policy corresponding with an IP address will be installed on the ipset rules module (550) only when a VPN client (505) attempts to make a connection to the FQDN corresponding with the IP address and a DNS request confirms that the IP address is still assigned to the FQDN.

Dynamic Policy Uninstallation:

The policies corresponding with an IP address installed on the ipset rules module (550) will be removed from the ipset rules module (550) and optionally from the ACL policies system automatically based on the TTL value in the DNS response.

Wild Card Support:

The VPN gateway can be accessed by a network administrator to manually configure access control policies either by providing the list of FQDNs and the corresponding policies or by using wild card characters in the host names, e.g. the administrator can configure policies for www.myhost.com to apply to other variations of the host name, e.g. for *.myhost.com, the ACL policy will be applied for all the subdomains in myhost.com, or for *.com, the ACL policy will be applied to every request.

Figure 6:
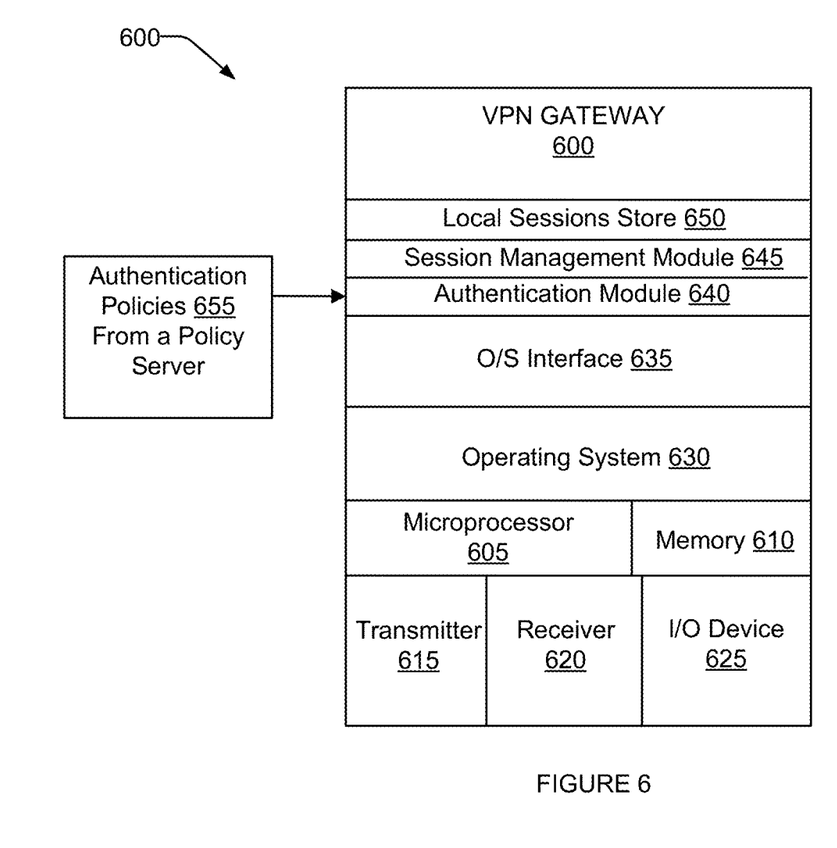
FIG. 6 depicts an example schematic diagram of a VPN network gateway device configure manage authentication and sessions management of end user devices, in accordance with one or more techniques described herein.

FIG. 6 depicts an example schematic diagram of a VPN network gateway device configure manage authentication and sessions management of end user devices, in accordance with one or more techniques described herein. Referring now to FIG. 6, the VPN gateway includes a gateway processor (605), a gateway memory module, (610), a gateway network interface device that includes a transmitter (615) and a receiver (620) and a gateway input output (I/O) module (625) that includes data and power input or output channels. An operating system (OS) (630) and an operating system interface module (635) are installed on the gateway memory module and operating on the gateway processor (605). The VPN gateway (600) includes an authentication module (640) installed on the gateway memory module and operating on the gateway processor. The authentication module (640) is configured to manage an authentication process used to authenticate end user devices and corresponding end user information. The authentication module (640) includes or receives authentication policy information (655) from a policy server, or the like, in communication with the VPN gateway (600). A sessions manager (645) installed on the gateway memory module and operating on the gateway processor manages active communication sessions and stores sessions information on a local sessions store (650).

Figure 7:
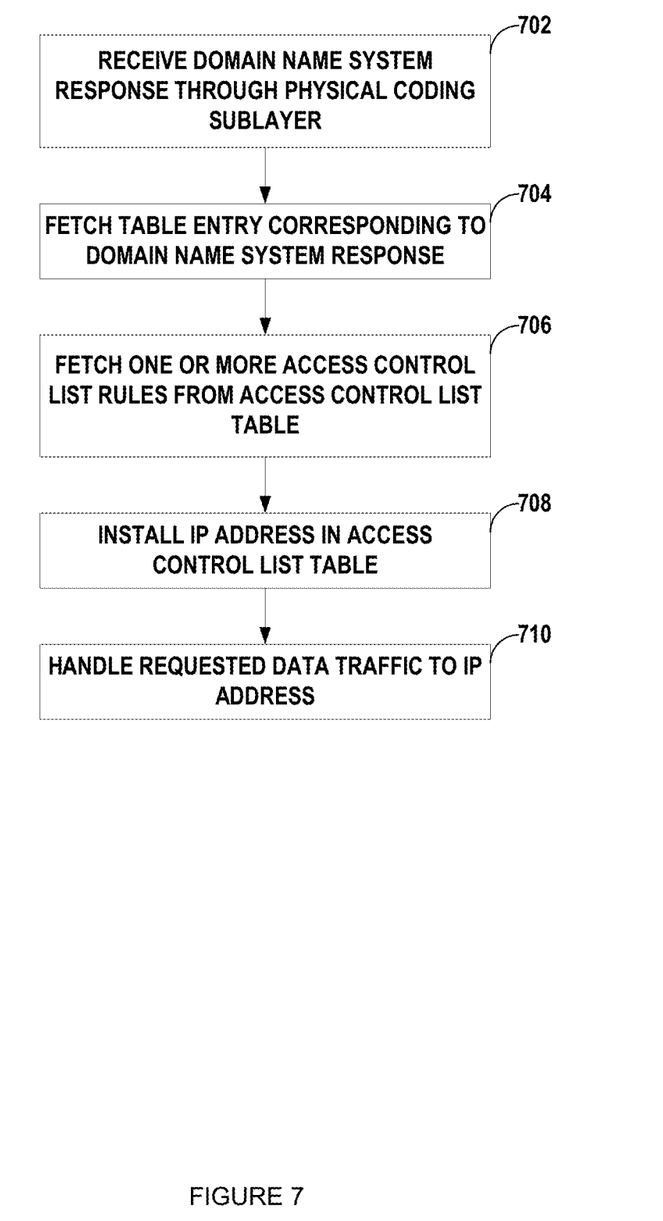
FIG. 7 depicts a process flowchart for a VPN network gateway device configured to enforce access control rules based on an IP address, according to an aspect of the present disclosure.

FIG. 7 depicts a process flowchart for a VPN network gateway device configured to enforce access control rules based on an IP address, according to an aspect of the present disclosure. The techniques described in FIG. 8 may be performed by a VPN gateway, such as VPN gateway 600 of FIG. 6. The following are steps of the process, although other examples of the process performed in accordance with the techniques of this disclosure may include additional steps or may not include some of the below-listed steps.

In accordance with the techniques described herein, VPN gateway 600 receives a domain name system response through a physical coding sublayer (702). VPN gateway 600 fetches a table entry corresponding to the domain name system response, wherein the table entry comprises a fully qualified domain name (704). VPN gateway 600 fetches one or more access control list rules from an access control list table for a specific user account corresponding to the table entry (706). VPN gateway 600 install an Internet protocol (IP) address in the access control list table for each of the one or more access control list rules for the specific user account (708). VPN gateway 600 handles requested data traffic to the IP address based on the one or more access control list rules (710).

In some examples, the VPN gateway may remove the IP address from the access control list based on a time to live (TTL) value in the domain name system response. In some instances, the one or more access control list rules may be an allow rule or a deny rule. In some instances, the fully qualified domain name of the table entry may be a domain name and one or more wildcard characters.

In some instances, VPN gateway 600 may also resolve each request for access to fully qualified domain names received from a mobile end user device by initiating a domain name service query. In such instances, VPN gateway 600 stores the fully qualified domain name and an internet protocol (IP) address provided by the domain name service query in the access control list with access control list rules corresponding with each fully qualified domain name.

Figure 8:
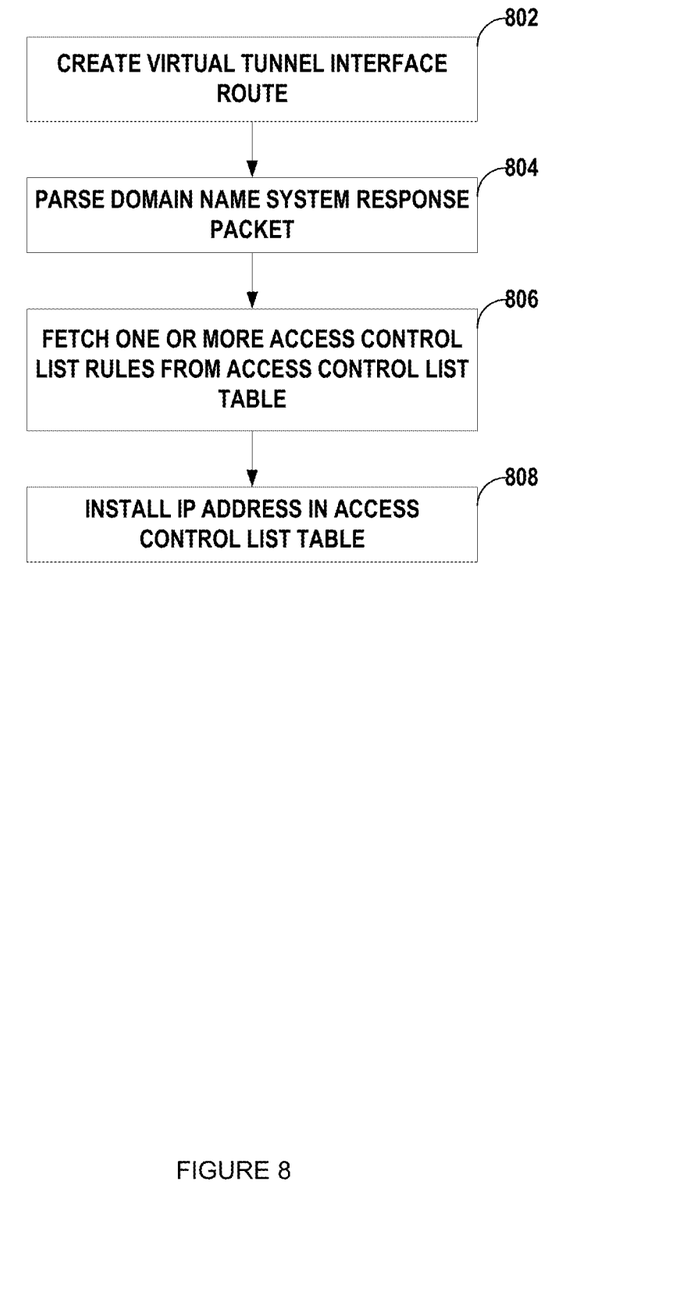
FIG. 8 depicts a process flowchart for splitting network traffic exiting the mobile computing device between a VPN tunnel and an external socket according to an aspect of the present disclosure.

FIG. 8 depicts a process flowchart for splitting network traffic exiting the mobile computing device between a VPN tunnel and an external socket according to an aspect of the present disclosure. The techniques described in FIG. 8 may be performed by a client device, such as mobile device 100 of FIG. 1. The following are steps of the process, although other examples of the process performed in accordance with the techniques of this disclosure may include additional steps or may not include some of the below-listed steps.

In accordance with the techniques described herein, mobile device 100 creates a virtual tunnel interface route between a client device and a port of a transmission control protocol (TCP) listener device (802). Mobile device 100 parses a domain name system response packet for a fully qualified domain name and an Internet protocol (IP) address (804). Mobile device 100 updates a domain name system cache with the fully qualified domain name and the IP address (806). Mobile device 100 then sends unencrypted network traffic to the TCP listener device over the virtual tunnel interface route (808).

In some examples, mobile device 100 may further receive an outbound TCP packet from the virtual tunnel interface route, wherein the outbound TCP packet comprises a destination IP address equal to the IP address in the domain name system response packet. The client device may also retrieve, from the domain name system cache, the fully qualified domain name corresponding to the destination IP address. Mobile device 100 may then determine whether the fully qualified domain name matches one of one or more fully qualified domain names received in an initial VPN configuration. In response to determining one of the one or more fully qualified domain names matches the fully qualified domain name, mobile device 100 may utilize the virtual tunnel interface route to transfer the outbound TCP packet. In response to determining none of the one or more fully qualified domain names match the fully qualified domain name, mobile device 100 may forward the outbound TCP packet to the TCP listener device by changing the destination IP address and expected port.

In some examples, mobile device 100 may also receive an outbound TCP synchronization packet and store a 4-tuple of a source port, a source IP address, a destination IP address, and a destination port in a map. In some examples, mobile device 100 may also redirect an inbound TCP packet with a source port originating from the TCP listener device to a user application.

In some examples, mobile device 100 may further send an accepted socket file descriptor to the TCP listener device. Mobile device 100 may then determine a real destination IP address and an expected port and create a TCP connection to the real destination IP and the expected port. In some instances, mobile device 100 does not include a kernel mode component configured to intercept packets.

In some instances, mobile device 100 may determine whether exit data network traffic corresponding with one or more user applications should be routed to a VPN gateway over a secure communication channel or whether the exit data network traffic should be directly routed to a destination IP address thereof over the virtual interface tunnel route. In some such instances, mobile device 100 divides the exit data traffic according to a fully qualified domain name of the network traffic destination based on an Access Control List (ACL) listing the fully qualified domain name and the determination of the exit data network traffic route. In other instances, mobile device 100 establishes a secure communication session with a VPN gateway and forwards all exit data traffic to the VPN gateway based on the determination of the exit data network traffic route, where mobile device 100 divides the exit data traffic according to a fully qualified domain name of the network traffic destination.

While the techniques of this disclosure have been described above in terms of particular examples, is the techniques are not limited thereto. Various features and aspects of the above described techniques may be used individually or jointly. Further, although the techniques of this disclosure have been described in the context of its implementation in a particular environment, and for particular applications (e.g. Access control list policies), its usefulness is not limited thereto and the present techniques can be beneficially utilized in any number of environments and implementations where it is desirable to update databases with IP addresses in a dynamic network environment.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above are included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A system for controlling network traffic, the system comprising:
 an access control table including a list of entries, wherein each entry includes a fully qualified domain name (FQDN), one or more IP addresses corresponding with each FQDN, and permissions and policies associated with the FQDN;
 a mobile computing device, including at least one processor and a memory configured to execute a user application and a virtual private network (VPN) handler on the mobile computing device, wherein:
  the user application is configured to establish a communications session with a transmission control protocol (TCP) listener device; and
  the VPN handler is configured to:
   split TCP network traffic and user datagram protocol (UDP) network traffic exiting the mobile computing device between a VPN tunnel and an external socket;
   route the TCP network traffic either over the VPN tunnel or over the external socket in response to:
    obtaining a FQDN corresponding with an IP address synchronization (SYN) packet used to initiate the communication session; and
    determining whether the FQDN is associated with a public or a private network;
   identify entries of the access control table that lack the permissions and policies associated with the FQDN;

send the entries to a VPN gateway through which the mobile computing device establishes the VPN tunnel; and receive new entries the VPN gateway returns that include the permissions and policies associated with the FQDN for updating the identified entries.

2. The system of claim 1, wherein the VPN handler encrypts and routes the TCP network traffic over the VPN tunnel in response to determining that the FQDN is associated with a private network.

3. The system of claim 1, wherein the VPN handler routes an unencrypted version of the TCP network traffic over the external socket in response to determining that the FQDN is associated with a public network.

4. The system of claim 1, wherein the VPN handler:
extracts information from the UDP network traffic including an IP address, a source port, and a destination port,
encrypts and routes the UDP network traffic over the VPN tunnel in response to determining that any of the extracted information is associated with a private network, and
routes an unencrypted version of the UDP network traffic over the external socket in response to determining that any of the extracted information is associated with a public network.

5. The system of claim 1, further comprising the VPN gateway through which the mobile computing device establishes the VPN tunnel, wherein the access control table is stored on the VPN gateway.

6. The system of claim 1, wherein the access control table is stored within the mobile computing device.

7. The system of claim 1, wherein the VPN handler:
determines whether to route the TCP network traffic either over the VPN tunnel or over the external socket by matching an IP address of the SYN packet associated with the TCP network traffic to the entries in the access control table, and
processes data packets of the TCP network traffic according to the permissions and policies of the matched entries.

8. The system of claim 1, wherein the VPN handler:
determines whether to route the UDP network traffic either over the VPN tunnel or over the external socket by matching any of a source port, a destination port, or an IP address of the UDP network traffic to the entries in the access control table, and
processes data packets of the UDP network traffic according to the permissions and policies of the matched entries.

9. The system of claim 1, further comprising a domain name service (DNS) cache that maps IP addresses to FQDNs, wherein the VPN handler:
obtains the FQDNs corresponding to the IP addresses using the DNS cache; and
populates the FQDNs in the entries of the access control table when the entries are lacking FQDNs corresponding to the IP addresses.

10. The system of claim 9, wherein the VPN handler:
issues a reverse DNS query to the DNS cache to reverse resolve the IP addresses to the FQDNs when IP addresses associated with the network traffic are known but no entries for the IP addresses exist in the access control table; and
adds entries to the access control table.

* * * * *